United States Patent [19]

Spray

[11] 4,093,170
[45] June 6, 1978

[54] SUPPORT FOR HAND GREASE GUN

[76] Inventor: Claude Spray, 6008 Arlington Blvd., Richmond, Calif. 94805

[21] Appl. No.: 764,460

[22] Filed: Jan. 31, 1977

[51] Int. Cl.² ............................................. A47G 29/00
[52] U.S. Cl. .................................... 248/359; 248/520; 248/538
[58] Field of Search ...................... 248/359, 82, 85, 86, 248/87, 88, 520, 538; 24/254, 132 AA

[56] References Cited

U.S. PATENT DOCUMENTS

| 531,998 | 1/1895 | Holmes | 24/254 |
| 778,865 | 1/1905 | Hyenga | 24/254 |
| 908,537 | 1/1909 | Baker | 24/254 |
| 2,614,779 | 10/1952 | Peterson et al. | 248/359 |
| 2,848,012 | 8/1958 | Scott et al. | 248/85 |
| 3,286,969 | 11/1966 | Frescobaldi | 248/359 |

FOREIGN PATENT DOCUMENTS 308,058  3/1929  United Kingdom ........... 24/132 AA

OTHER PUBLICATIONS

Cordless Soldering Tool, 8-1947 Popular Science.

*Primary Examiner*—Robert A. Hafer
*Attorney, Agent, or Firm*—Clarence A. O'Brien; Harvey B. Jacobson

[57] ABSTRACT

An upstanding panel member is provided having an opening formed therethrough in an upper portion thereof for snugly, but slidingly receiving the rear end portion of a cylindrical grease gun body therethrough. An elongated lever is hingedly supported, intermediate its opposite ends, from one side of the panel member for oscillation about an axis extending transversely of the lever, spaced outwardly of the opening and disposed generally normal to a line extending between the axis and the center of the opening. One end portion of the lever extends toward and projects slightly into the adjacent portion of the opening when that end portion of the lever is disposed at least generally normal to the center line of the opening and the other end of the lever is spaced outward from the panel member and swingable theretoward in order to swing the first mentioned end portion of the lever away from the panel member and to thus retract the free terminal end thereof away from the opening. Spring structure is operatively connected between the lever and the panel member for yieldingly biasing the lever to a position with the first mentioned end thereof swung toward the panel member and the terminal end thereof projecting slightly into the opening, whereby a cylindrical grease gun body projecting through the opening may be engaged by the end portion of the lever projecting into the opening and retained in position relative to the panel member by the lever.

3 Claims, 4 Drawing Figures

SUPPORT FOR HAND GREASE GUN

BACKGROUND OF THE INVENTION

Hand grease guns of the type including an elongated cylindrical body and equipped with a flexible grease discharging pressure hose at one end terminating outwardly in a grease fitting coupling are becoming increasingly popular by persons who grease the chassis of their own vehicles and by other persons at least occasionally wishing to perform vehicle chassis greasing operations while lying in a prone position beneath the vehicle chassis.

While some grease guns are provided with rigid grease discharging pipes equipped with grease fitting couplings at their outer terminal ends, and such grease guns may be readily manipulated by a user with one hand grasping the cylindrical body of the grease gun and the other hand being utilized to oscillate the actuating lever of the grease gun, in many instances a flexible grease delivery pressure hose is more desirable than a rigid grease delivery pipe, inasmuch as chassis grease fittings are not always accessible when using a grease gun equipped with a rigid grease discharge pipe. Accordingly, the use of flexible grease discharge hoses has become more prevelent.

However, when a grease gun utilizing a flexible delivery or discharge hose is used, the discharge end of the hose must be held in one hand and only one other hand of the user of the grease gun remains free to actuate the operating lever of the grease gun. Accordingly, if the vertical spacing between the fitting to be greased and the surface upon which the vehicle chassis is supported is not too great, the body of the grease gun may be positioned horizontally on the surface and the user's remaining hand may be utilized to oscillate the lever of the grease gun toward and away from the support surface therefor. However, utilization of the grease gun in this manner results in a tendency of the cylindrical body of the grease gun to roll to either one side or the other on the support surface therefor and if the vertical spacing between the fitting to be greased and the support surface is too great to enable the body of the grease gun to rest upon the support surface, it is substantially impossible for a person using the grease gun to operate the latter while maintaining manual pressure on the free end of the delivery hose so as to maintain the grease fitting coupling thereon in proper engagement with the associated chassis grease fitting. Accordingly, a need exists whereby the cylindrical body of a grease gun may be supported in elevated position above a support surface and in a manner substantially eliminating the tendency of the grease gun to roll relative to the surface from which it is supported.

While various forms of stands for supporting various elements in elevated inclined positions have been heretofore provided these are not specifically adapted for support of the cylindrical body of a grease gun therefrom.

Examples of stands which have been previously patented and include some of the structural and operational features of the instant invention are disclosed in U.S. Pat. Nos. 1,114,033, 1,339,885, 1,809,550, 2,025,895 2,041,174, and 2,778,679.

BRIEF DESCRIPTION OF THE INVENTION

The support of the instant invention comprises an upstanding panel member including a lower end portion adapted to engage and be supported from a horizontal support surface. An upper portion of the panel member has a cylindrical opening formed therethrough adapted to receive the elongated cylindrical body of a hand grease gun therethrough and structures provided and supported from the panel member for clampingly engaging a cylindrical body of the grease gun projecting through the opening.

The main object of this invention is to provide a support for a hand grease gun of the type including an elongated cylindrical body.

Another object of this invention is to provide a support for a hand grease gun that may be readily constructed so as to be adaptable for use in conjunction with grease guns of different sizes.

Still another object of this invention is to provide a hand grease gun support including structure whereby the grease gun body to be supported therefrom will be clamped in position relative to the support.

A final object of this invention to be specifically enumerated herein is to provide a hand grease gun support in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
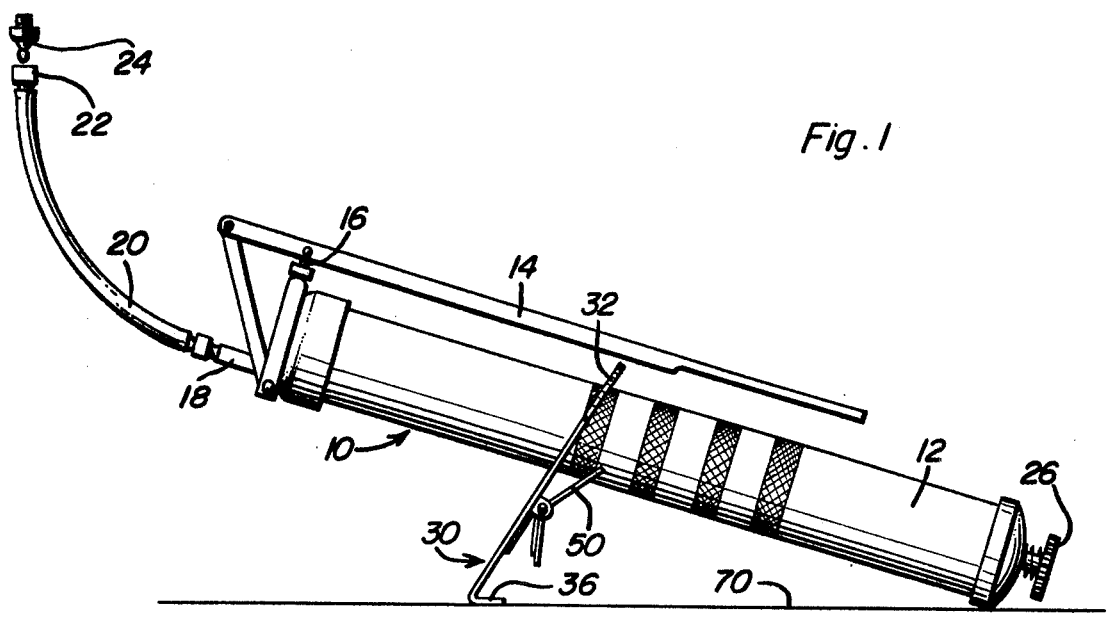
FIG. 1 is a side, elevational view of the support of the instant invention in operative association with a hand grease gun and with the grease gun supported from the support in a slightly forwardly and upwardly inclined position.

Referring now more specifically to the drawings, the numeral 10 generally designates a conventional form of hand grease gun. The grease gun 10 includes an elongated cylindrical body 12 from which an oscillatable lever 14 is supported. The lever 14 actuates a low capacity high pressure pump rod 16 and the forward end portion of the body 12 includes a grease discharge fitting 18 to which the inlet end of a flexible grease delivery hose 20 is removably coupled. The outlet end of the grease delivery hose 20 is provided with a grease fitting coupling 22 of conventional design for releasable engagement with a conventional form of grease fitting 24.

The grease gun 10 is of the type utilizing an internal spring biased piston for feeding grease from the barrel 12 to the pump 16 and a handle 26 projects outwardly of the rear end of the body 12 and may be pulled outwardly from the body 12 in order to retract the spring biased piston in order to enable a new cartilage of grease to be placed within the barrel 12. It is pointed out that the grease gun 10 is of a well known type available through many different automotive parts stores and chain stores handling automotive equipment.

Figure 2:
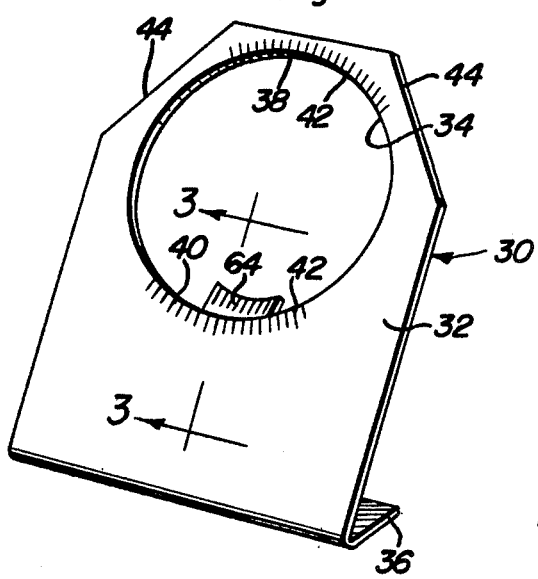
FIG. 2 is an enlarged, perspective view of the grease gun support.
Figure 3:
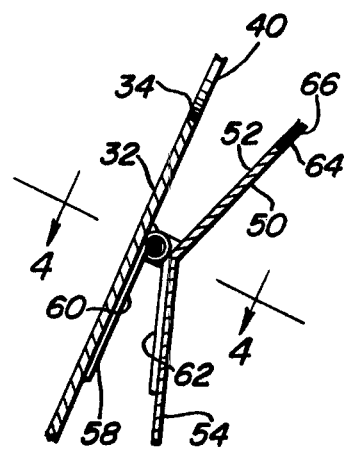
FIG. 3 is an enlarged, fragmentary, vertical, sectional view taken substantially upon the plane indicated by the section line 3—3 of FIG. 2.
Figure 4:
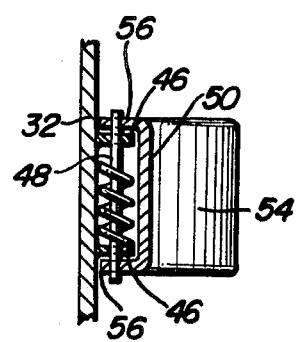
FIG. 4 is a horizontal, sectional view taken substantially upon the plane indicated by the section line 4—4 of FIG. 3.

Referring now more specifically to FIGS. 1 and 2 of the drawings, it may be seen that a support for the grease gun 10 is referred to in general by the reference numeral 30. The support 30 comprises an upstanding panel member 32 having a circular opening 34 formed through its upper end portion. The panel member 32 terminates downwardly in a horizontally directed support flange 36 formed integrally with the panel member 32 and the upper and lower marginal portions 38 and 40 of the opening 34 are roughened by forming chisel cuts 42 therein at points spaced therealong approximately one-eighth inch apart. The panel member 32 may be constructed of one-eighth inch thick mild sheet steel and the upper corners of the panel member 32 may be angularly cut as at 44 to reduce the possibility of injury due to right angle corners.

The rear side of the panel member 32 includes a pair of horizontally aligned and rearwardly outwardly projecting apertured mounting ears 46 spot welded to the panel member 32 and a hinge pin 48 extends between and through the ears 46. An elongated lever 50 constructed of one-sixteenth inch mild steel is provided an angulated intermediate its opposite ends so as to provide relatively angulated end portions 52 and 54. The opposite side portions of the longitudinal central portion of the lever 50 includes integral laterally outwardly struck apertured mounting ears 56 through which the end portions of the pivot pin 48 are rotatably received and the lever 50 is thus oscillatably supported from the mounting ears 46. A butterfly spring 58 is coiled about the pin 48 and has its opposite arms 60 and 62 engaged with confronting surfaces of the panel member 32 and the end portion 54 of the lever 50.

The terminal end of the end portion 50 includes a slightly transversely concave terminal end edge 64 conforming, generally, in curvature to the periphery of the opening 34. The end edge 64 is roughened as at 66 in the same manner that the upper and lower marginal portions 38 and 40 of the opening 34 are roughened and the free end of the end portion 52 of the lever 50 projects slightly inwardly of the lower peripheral portion 40 of the opening 34 when the end portion 52 is swung toward the plate 32 in a position generally paralleling the plate 32. However, the free end of the end portion 52 may be retracted away from the lower periphery of the opening 34 by displacing the end portion 54 of the lever 50 toward the panel member 32 and thus swinging the end portion 52 of the lever 50 away from the panel member 32.

In operation, the rear end portion of the barrel 12 of the grease gun 10 is inserted through the opening 34 from the front side thereof while finger pressure is applied to the end portion 54 of the lever 50 so as to bias the end portion 54 toward the panel member 32 and thus retract the end portion 52 of the lever 50 from the lower periphery of the opening 34. After the barrel 12 has been inserted through the opening 34 to the position thereof illustrated in FIG. 1, finger pressure on the end portion 54 of the lever 50 may be released whereby the butterfly spring 58 will yieldingly bias the end portion 52 of the lever 50 toward the panel member 32 and thus engage the underside of the barrel 12 and clamp the latter between the edge 64 and the upper periphery 38 of the opening 34. In this manner, the barrel 12 of the gun 10 may be secured in position through the opening 34 and the support 30 may be disposed on the surface 70 beneath a vehicle chassis which is to be lubricated and includes at least the grease fitting 24.

With the grease gun 12 positioned from the surface 70 in the manner illustrated in FIG. 1 of the drawings, the discharge end of the hose 20 may be held in one hand of the user of the gun 10 and the lever 14 of the gun 10 may be oscillated by the other hand of the user. The grease gun 10 may thus be actuated to supply grease under pressure to the fitting 24 after the coupling 22 has been engaged with the fitting 24.

Although the apertured mounting ears 46 are formed separately from the panel 32 and secured to the latter by welding, the apertured mounting ears 46 may be struck from the panel member 32 below the opening 34, if desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A support for a hand grease gun of the type including an elongated cylindrical body and an oscillatable pump actuating lever swingable toward and away from one side of said body, said support comprising an upstanding inclined panel member having an opening formed through an upper portion thereof and including upstanding opposite side marginal portions and upper and lower marginal portions, said opening being of a size to snugly, but slidingly receive the rear end portion of a cylindrical grease gun body therethrough, an elongated upstanding lever hingedly supported, intermediate its opposite ends, from the downwardly facing side of said panel member for oscillation about a horizontal axis spaced below said opening and extending transversely of said lever outwardly of said side, the upper end portion of said lever extending toward and having its free end projecting slightly into the adjacent lower portion of said opening when said upper end portion is disposed at least generally normal to the center line of said opening, the other lower end of said lever being displaceable toward said panel member in order to effect swinging of said one end portion away from said panel member and retraction of said free end outwardly of said opening, the upper extremity of said opening being spaced but slightly from the upper marginal portion of said panel member, spring means operatively connected between said lever and said panel member yieldingly biasing said lever toward a position with said one end portion thereof disposed generally normal to the center line of said opening and the free terminal end thereof projecting into said opening, the lower marginal edge of said panel member including an integral laterally directed integral horizontal support flange for support from a horizontal support surface, said support flange projecting outwardly of said downwardly facing side of said panel member and the included angle defined between said panel member and support flange being less than 90°.

2. The combination of claim 1 wherein the portions of said panel member defining the upper and lower peripheries of said opening have spaced side-by-side cuts formed therein and spaced therealong opening into said opening.

3. The combination of claim 2 wherein the marginal edge of the free end of said one end portion of said lever has spaced side-by-side cuts formed therein and spaced therealong opening outwardly of said free end.

* * * * *